United States Patent
Park

(10) Patent No.: US 8,429,461 B2
(45) Date of Patent: Apr. 23, 2013

(54) APPARATUS AND METHOD FOR DIAGNOSING CABLECARD-RELATED STATUS AND PERFORMING PROPER PROCESSING ACCORDING TO DIAGNOSIS RESULT IN OPENCABLE SYSTEM, OPENCABLE HOST, AND OPENCABLE RECEPTION APPARATUS

(75) Inventor: Young-min Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 628 days.

(21) Appl. No.: 11/200,152

(22) Filed: Aug. 10, 2005

(65) Prior Publication Data
US 2006/0059391 A1 Mar. 16, 2006

(30) Foreign Application Priority Data

Aug. 10, 2004 (KR) .................. 10-2004-0062773
Jun. 21, 2005 (KR) .................. 10-2005-0053604

(51) Int. Cl.
*G06F 11/00* (2006.01)
(52) U.S. Cl.
USPC ............................................. 714/43
(58) Field of Classification Search .......... 714/43
See application file for complete search history.

(56) References Cited

U.S. PATENT DOCUMENTS

| | | | |
|---|---|---|---|
| 6,507,907 B1 | 1/2003 | Takahashi et al. | |
| 6,516,445 B1* | 2/2003 | Genovese | 714/821 |
| 2001/0011375 A1 | 8/2001 | Yun | |
| 2002/0147989 A1* | 10/2002 | Kessler | 725/134 |
| 2002/0186004 A1* | 12/2002 | Prazeres da Costa et al. | 324/158.1 |
| 2003/0084440 A1* | 5/2003 | Lownes | 725/6 |
| 2004/0093619 A1* | 5/2004 | Cox | 725/110 |
| 2004/0177370 A1* | 9/2004 | Dudkiewicz | 725/46 |
| 2004/0194145 A1* | 9/2004 | Douillet et al. | 725/110 |
| 2004/0218211 A1 | 11/2004 | Suzuki | |
| 2005/0034028 A1* | 2/2005 | Son | 714/43 |

(Continued)

FOREIGN PATENT DOCUMENTS

| | | |
|---|---|---|
| JP | 10-336621 A | 12/1998 |
| JP | 11-331399 A | 11/1999 |

(Continued)

OTHER PUBLICATIONS

Microsoft, Windows XP SP2, May 2004, (Windows XP SP2 Screen Dumps.pdf).*
Extended European Search Report issued in counterpart Application No. 05780598.8, dated Sep. 27, 2010.

(Continued)

*Primary Examiner* — Scott Baderman
*Assistant Examiner* — Jigar Patel
(74) *Attorney, Agent, or Firm* — Sughrue Mion, PLLC

(57) ABSTRACT

Provided are a method and apparatus for diagnosing a Cable-CARD-related status and performing proper processing according to the diagnosis result in an OpenCable system; an OpenCable host; and an OpenCable reception apparatus. The CableCARD-related status diagnosis and processing apparatus includes: a diagnosis unit diagnosing the CableCARD-related status or a network-related status; and a processor performing processing according to the status determined from the diagnosis result. Therefore, by installing a software-processing logic against critical errors or definite faults in a television or a set-top box in an OpenCable system, it is possible to diagnose a CableCARD-related status and quickly handle the CableCARD when an error is generated in the CableCARD, thereby reducing costs to service providers and providing an improvement in service quality to users.

16 Claims, 5 Drawing Sheets

U.S. PATENT DOCUMENTS

| | | | |
|---|---|---|---|
| 2005/0138667 A1* | 6/2005 | Delpuch | 725/105 |
| 2005/0160015 A1 | 7/2005 | Shin | |
| 2005/0176418 A1* | 8/2005 | Leib et al. | 455/423 |
| 2005/0261861 A1* | 11/2005 | Schahl et al. | 702/122 |
| 2006/0003795 A1 | 1/2006 | Yamanaka et al. | |

FOREIGN PATENT DOCUMENTS

| | | |
|---|---|---|
| JP | 2001-326655 A | 11/2001 |
| JP | 2004-104308 A | 4/2004 |
| JP | 2004-134878 A | 4/2004 |
| JP | 2004-153800 A | 5/2004 |
| KR | 2001-0073305 A | 8/2001 |
| WO | 2004/052007 A1 | 6/2004 |

OTHER PUBLICATIONS

Society of Cable Telecommunications Engineers, et al.; "American National Standard ANSI/SCTE 28 2004 Host-Pod Interface Standard"; American National Standard; May 10, 2004; pp. 213-226 (236 pages total) ; XP002413348.

American National Standards Institute: "SAV3521" [Online]; vol. 35 No. 21; May 21, 2004; pp. 1-15; XP002597130; ISSN: 0038-9633.

Communication from the European Patent Office dated Jun. 24, 2011, in counterpart European Application No. 05780598.8.

Communication issued by the Japanese Patent Office dated Jan. 25, 2011 in counterpart Japanese application No. 2007-525535.

* cited by examiner

FIG. 4A

```
CABLECARD CRITICAL ERROR!!!
PLEASE CALL THE SERVICE PROVIDER AND CHANGE THE NEW CABLECARD
```

FIG. 4B

```
CABLECARD OPERATION IS UNSTABLE!!
PLEASE CALL THE SERVICE PROVIDER AND CHANGE THE NEW CABLECARD
```

FIG. 4C

```
NETWORK STATE IS UNSTABLE!!
PLEASE CALL THE SERVICE PROVIDER
```

FIG. 4D

```
PREVIOUS CABLECARD FIRMWARE VER : 00.11.00
CURRENT CABLECARD FIRMWARE VER :00.11.01
CURRENT CABLECARD FIRMWARE IS UNSTABLE!!
```

FIG. 4E

```
CURRENT SERVICE MODE : DOCSIS
CABLECARD SUPPORT MODE : OOB/DOCISIS(OOB ONLY)
```

APPARATUS AND METHOD FOR DIAGNOSING CABLECARD-RELATED STATUS AND PERFORMING PROPER PROCESSING ACCORDING TO DIAGNOSIS RESULT IN OPENCABLE SYSTEM, OPENCABLE HOST, AND OPENCABLE RECEPTION APPARATUS

CROSS-REFERENCE TO RELATED PATENT APPLICATIONS

This application claims priority from Korean Patent Applications Nos. 10-2004-0062773, filed on Aug. 10, 2004 and 10-2005-0053604, filed on Jun. 21, 2005, in the Korean Intellectual Property Office, the disclosures of which are incorporated herein in their entireties by reference.

BACKGROUND OF THE INVENTION

1. Field of the Invention

Apparatuses and methods consistent with the present invention relate to diagnosing a CableCARD-related status and performing proper processing according to the diagnosis result in an OpenCable system, an OpenCable host, and an OpenCable reception apparatus.

2. Description of the Related Art

As many broadcast systems become digital, the use of digital broadcast contents increases. Accordingly, the importance of copy-protection technologies and subscriber authentication for protecting digital broadcast contents which are produced by investing enormous amounts of funds and human resources, is also increasing. If an embedded CAS (Conditional Access System) is hacked, no method exists to protect a provider from the hacking. However, if a Cable-CARD is used, it is possible to protect a provider from such hacking without much difficulty and at low cost by changing the CableCARD to a new one.

Under this environment, the United States has adopted an OpenCable standard by CableLabs as a next-generation digital cable broadcast standard to be used after 2005. Recently, Korea has adopted the OpenCable standard as a domestic digital cable broadcast transmission/reception matching standard. The OpenCable standard is based on MPEG-2, which is an image standard, and Data Over Cable Service Interface Specification (DOCSIS), which is a cable modem transmission standard.

The OpenCable standard is divided into a hardware part and a software part. The hardware part of the OpenCable standard is composed of a set-top box and a Point Of Deployment (POD) device that provides security and reception functions and is separated from the set-top box. The separation of the POD device from the set-top box is aimed at establishing a competitive system for producing and supplying set-top boxes that is not restricted by solutions supplied by specific companies, and as a result, leads to commercialization and cost reduction of set-top boxes.

The software part of the OpenCable standard is middleware based on an OpenCable Application Platform (OCAP) standard. The OCAP standard is a standard for interactive services in cable broadcast. The OCAP standard can provide web-based services to a cable broadcast, so as to support enhanced bi-directional services to viewers.

FIG. 1 is a block diagram of a conventional OpenCable system.

Referring to FIG. 1, the conventional OpenCable system includes a network 110, a headend 120, a host 130, and a CableCARD 140.

The headend 120 is a signal source for all signals delivered to downstream systems and may be a sky-wave broadcast station, a satellite service, a local microwave relay, etc. The headend 120 and host 130 perform A/V, Out-Of-Band (OOB), and DOCSIS bi-directional communications with each other via a Hybrid Fiber Coaxial (HFC) network. The host 130 may be a set-top box or a television, and includes electronic devices for transferring broadcast signals from a source to a subscriber and converting the broadcast signals into other formats. The host 130 and the CableCARD 140 perform successive data transmissions and basic protocol communications through data/address line communication. The CableCARD 140 additionally has a descrambling function for Audio/Video (A/V) streams and scrambled streams and a copy-protection function for contents protection. Also, along with providing the interactive services, the CableCARD can also function as a communication device so that it can support communications through a CableCARD modem and a DOCSIS modem.

As such, in the OpenCable system, since a CableCARD is indispensable, there may be cases when no service is provided due to CableCARD-related problems. In these cases, users cannot actually obtain any information about such problems, but must know what the problems are or why no service is received. However, it is difficult for even a service provider to find the cause of the service or communication interruption. Also, many inconveniences arise, such as the time consumed when finding the cause of such problems, during which the user cannot utilize any services.

SUMMARY OF THE INVENTION

The present invention provides an apparatus and method for diagnosing a CableCARD-related status and performing proper processing according to the diagnosis result in an OpenCable system, thereby initially entering a normal operation mode and allowing a user to perform proper controls through informing him/her of the generation of a critical error, service interruptions, or network-related diagnosis results. A OpenCable host and an OpenCable reception apparatus consistent with the present invention are also provided.

According to an aspect of the present invention, there is provided an apparatus for diagnosing a CableCARD-related status and performing proper processing according to the diagnosis result in an OpenCable system, the apparatus comprising: a diagnosis unit diagnosing the CableCARD-related status or a network-related status; and a processor performing processing according to the status determined from the diagnosis result.

The processor performs at least one of: outputting a first error message to a user interface if access to a virtual memory of the CableCARD is disallowed or if an error exists in Card Information Structure (CIS) data of the CableCARD; outputting a second error message to the user interface if a response time of the CableCARD exceeds a first predetermined threshold time; performing a ping test or outputting a third error message to the user interface if communication with the outside is disconnected for a second predetermined threshold time; outputting a fourth error message to the user interface if communication with a headend is disconnected; outputting to the user interface a fifth error message and information indicating to which version software of the CableCARD is upgraded if an error is generated while the software of the CableCARD is upgraded; and outputting information regarding a communication method of the CableCARD to the user interface if a request for the information is received.

The processor outputs the first error message to the user interface if the access to the virtual memory of the Cable-CARD is disallowed or if an error exists in the CIS data of the CableCARD after an initialization operation of the Cable-CARD is performed at least three times.

The processor resets the software or hardware of the Cable-CARD and outputs the second error message to the user interface if the response time exceeds the first predetermined threshold time after the software or hardware of the Cable-CARD is reset.

The processor performs a ping test and outputs the third error message to the user interface if the ping test fails.

According to another aspect of the present invention, there is provided an OpenCable host apparatus comprising: a main circuit receiving a broadcast signal via a network and decoding and outputting the broadcast signal; a controller controlling the main circuit, communicating with the network through the main circuit, diagnosing a POD module-related status or a network-related status, and performing processing according to the status determined from the diagnosis result, wherein the POD module is removable; and a POD interface communicating with the POD module.

According to still another aspect of the present invention, there is provided an OpenCable reception apparatus comprising: a host including a main circuit receiving a broadcast signal via a network and decoding and outputting the broadcast signal, and a controller controlling the main circuit, communicating with the network through the main circuit, diagnosing a POD module-related status or a network-related status, and performing processing corresponding to the status according to the diagnosis result, wherein the POD module is removable; and a CableCARD which is removably plugged into the host.

According to still yet another aspect of the present invention, there is provided a method of diagnosing a CableCARD-related status and performing proper processing according to the diagnosis result in an OpenCable system, comprising: diagnosing the CableCARD-related status or a network-related status; and performing processing according to the status determined from the diagnosis result.

The processing comprises at least one of: outputting a first error message to a user interface if access to a virtual memory of a CableCARD is disallowed or if an error exists in Card Information Structure (CIS) data of the CableCARD; resetting software or hardware of the CableCARD or outputting a second error message to the user interface if a response time of the CableCARD exceeds a predetermined threshold time; performing a ping test or outputting a third error message to the user interface if communication with the outside is disconnected for a second predetermined threshold time; outputting a fourth error message to the user interface if communication with a headend is disconnected; outputting, through the user interface, a fifth error message and information indicating to which version the software of the CableCARD is upgraded if an error is generated while the software of the CableCARD is upgraded; and outputting information regarding a communication method of the CableCARD through the user interface if a request for the information is received.

BRIEF DESCRIPTION OF THE DRAWINGS

The above and other aspects of the present invention will become more apparent by describing in detail exemplary embodiments thereof with reference to the attached drawings in which:

FIG. 4A shows an example of an error message displayed through a user interface when access to a virtual memory of a CableCARD is disallowed or when the data configuration of a Card Information Structure (CIS) is mismatched;

FIG. 4B shows an example of an error message displayed through the user interface when a response time exceeds three seconds;

FIG. 4C shows an example of an error message displayed through the user interface when communication is disconnected for thirty seconds;

FIG. 4D shows an example of an error message displayed through the user interface when an error is generated while software of a CableCARD is upgraded; and FIG. 4E shows an example of an information message regarding a CableCARD communication method.

DETAILED DESCRIPTION OF THE INVENTION

The present invention will now be described more fully with reference to the accompanying drawings, in which exemplary embodiments of the invention are shown.

Figure 1:
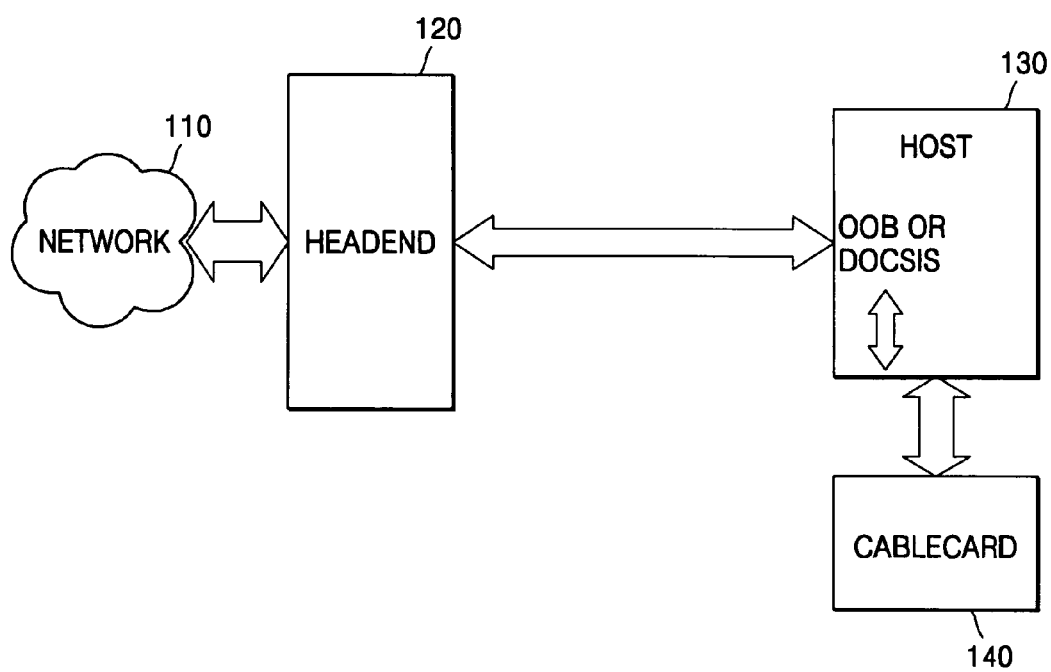
FIG. 1 is a block diagram of a conventional OpenCable system.
Figure 2:
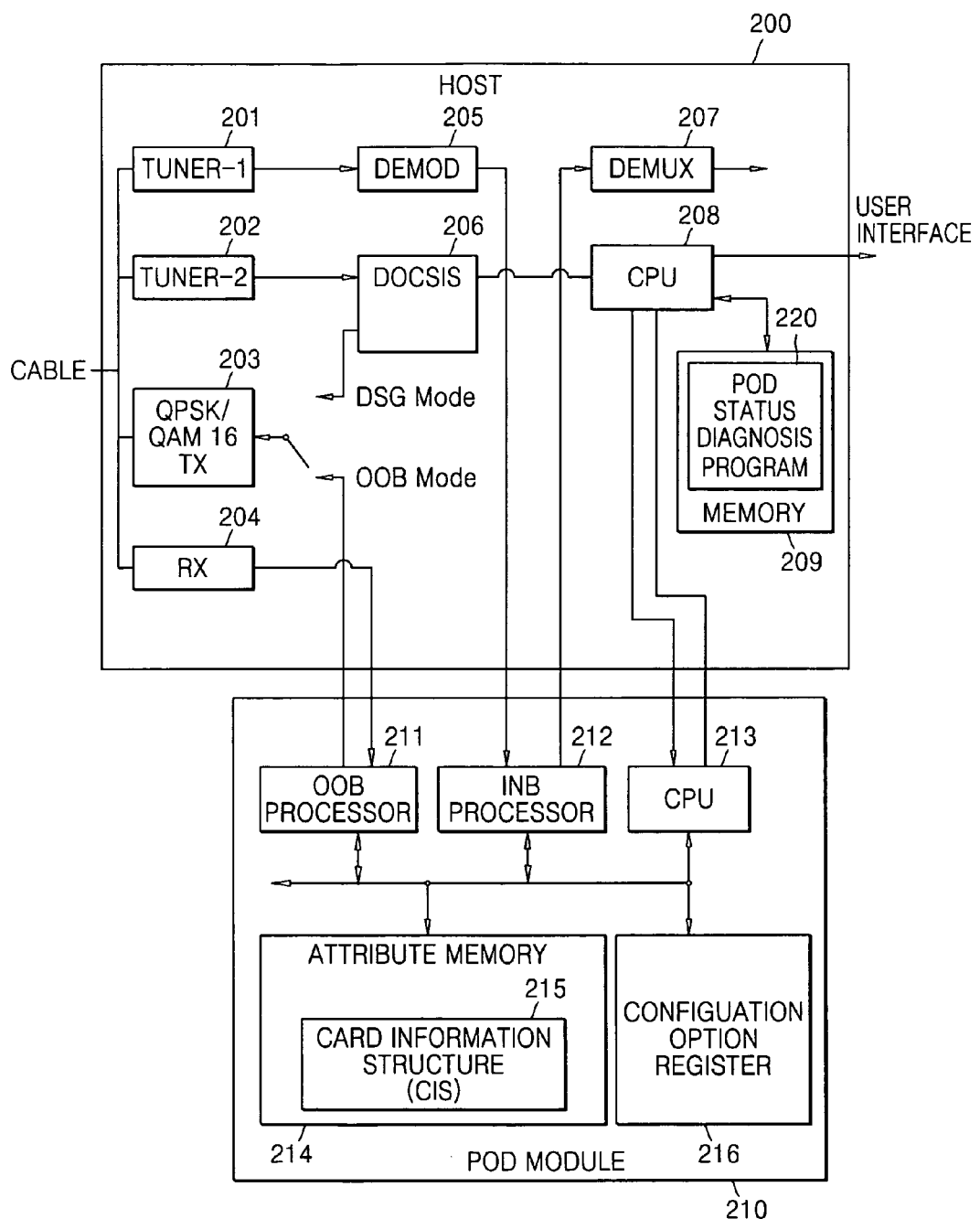
FIG. 2 is a block diagram of an OpenCable host according to an exemplary embodiment of the present invention.

FIG. 2 is a block diagram of an OpenCable host 200 according to an exemplary embodiment of the present invention.

Referring to FIG. 2, the OpenCable host 200 includes a first tuner 201, a second tuner 202, a QPSK/QAM 16 transmitter (TX) 203, a receiver (RX) 204, a demodulator 205, a DOCSIS modem 206, a demultiplexer 207, a CPU 208, and a memory 209.

A signal received via the first tuner 201 is demodulated by the demodulator 205 and is input to an In-Band (INB) processor 212 of a POD module 210. A signal received via the second tuner 202 is input to the CPU 208 via the DOCSIS modem 206. The RX 204 converts received data into a serial bit stream with a predetermined bit rate and transfers the serial bit stream to an OOB processor 211 of the POD module 210. The serial bit stream is mainly used for transmitting a limited access authorization management message from a cable system to a POD module. The QPSK/QAM 16 TX 203 modulates data received in a DOCSIC mode or in an OOB mode with a predetermined bit rate and transmits the modulated data through a cable. The demultiplexer 207 receives and demultiplexes data processed by the INB processor 212 of the POD module 210.

The CPU 208 controls the respective components of the host 200. Specifically, the CPU 208 loads a POD status diagnosis program 220, diagnoses a POD module-related status or a network-related status, performs proper processing according to the diagnosis result, and outputs an appropriate message through a user interface so as to inform a user of information regarding the current status. The status information diagnosed by the CPU 208 is classified into status information regarding the CableCARD and status information regarding the network. The status information regarding the CableCard includes information, such as whether access to the virtual memory of the CableCARD is disallowed, whether the Card Information Structure (CIS) of the CableCARD is correct, whether a response time of the CableCARD exceeds a predetermined reference time, and so on. The status information regarding the network includes information such as whether communication with the outside is disconnected for thirty seconds, whether communication with a headend is disconnected regardless of A/V data transmission, whether an error is generated while software of the CableCARD is upgraded, whether information regarding the communication method of the CableCARD is requested, and so on. After diagnosing the CableCARD-related status or the network-related status, the CPU 208 performs proper processing according to the diagnosis result. If such processing is useless or if a critical error is generated, the CPU 208 outputs a message through the user interface in order to inform the user of the fact. The diagnosing and processing will be described in detail later with reference to FIG. 3.

The POD module 210 is a removable module and may be a type of PC card which is plugged into a PCMCIA slot of a host. The POD module 210 has a security/access restriction function as well as a signal processing function and can be updated and replaced. Referring to FIG. 2, the POD module 210 plugged into the host 200 includes the OOB processor 211, the INB processor 212, a CPU 213, an attribute memory 214, and a configuration option register (COR) 216. FIG. 2 shows only components of the POD module 210 related to the present invention, and not the remaining components of the POD module 210.

The OOB processor 211 performs deinterleaving, Reed-Solomon coding, and de-randomizing on the data stream received from the RX 204 of the host 200. The CPU 213 performs Media Access Control (MAC) layer protocol processing, such as MAC reassembly or MAC header analysis, on the data processed by the OOB processor 211.

The INB processor 212 demultiplexes an MPEG-2 multi-program stream received from the demodulator 205 into a program elementary stream, then multiplexes data encoded in a copy-protection engine to an MPEG-2 multiprogram stream, and transfers the results to the demultiplexer 207 of the host 200.

The CPU 213 controls the respective components of the POD module 210 and creates a secret key to be used in a user authentication and copy-protection system.

The attribute memory 214 stores card information structure (CIS) data. A CIS 215 is a data structure defined in the PCMCIA specification. The CableCARD has the same form as existing PCMCIA cards and operates under processes or protocols based on the PCMCIA 2.0 specification. The CIS 215 includes information, such as what the PCMCIA card is used for, the manufacturer of the CableCARD, a specification related to the CableCARD, and so on. The main information of the CIS 215 includes supply voltage-related information (e.g., VCC, VPP), serial code, module name, version information, etc. of the CableCARD.

The COR 216 must be set to a predetermined value in order to allow the PCMCIA card to enter a CableCARD mode. The host 200 can allow the PCMCIA card to enter the Cable-CARD mode by correctly writing a SCTE Interface ID Number (SCTE_IFN) value to the COR 216.

Figure 3A:
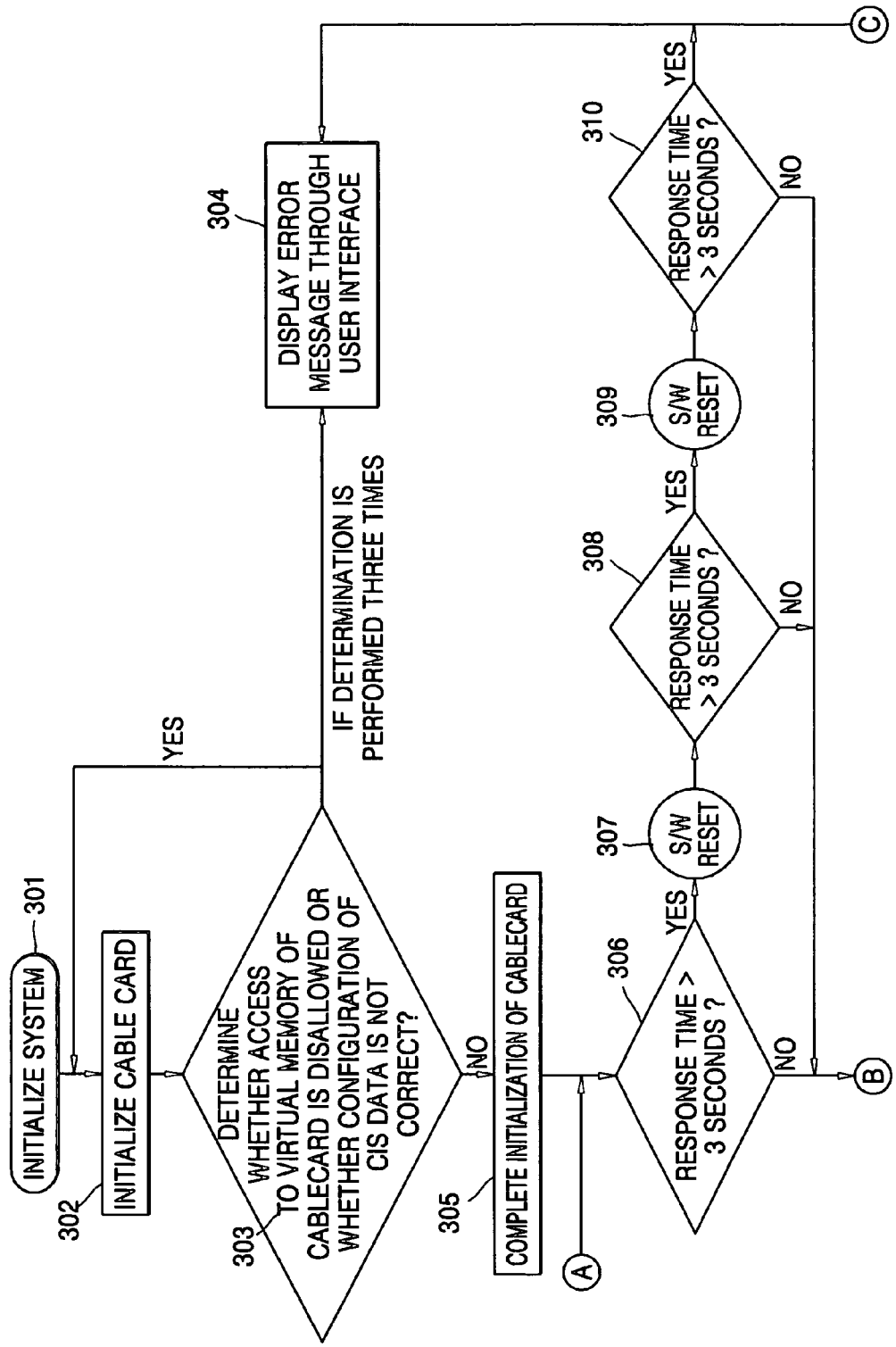
FIGS. 3A and 3B show a flowchart illustrating a method for diagnosing a Point Of Deployment (POD) status in the OpenCable host, according to an exemplary embodiment of the present invention.
Figure 3B:
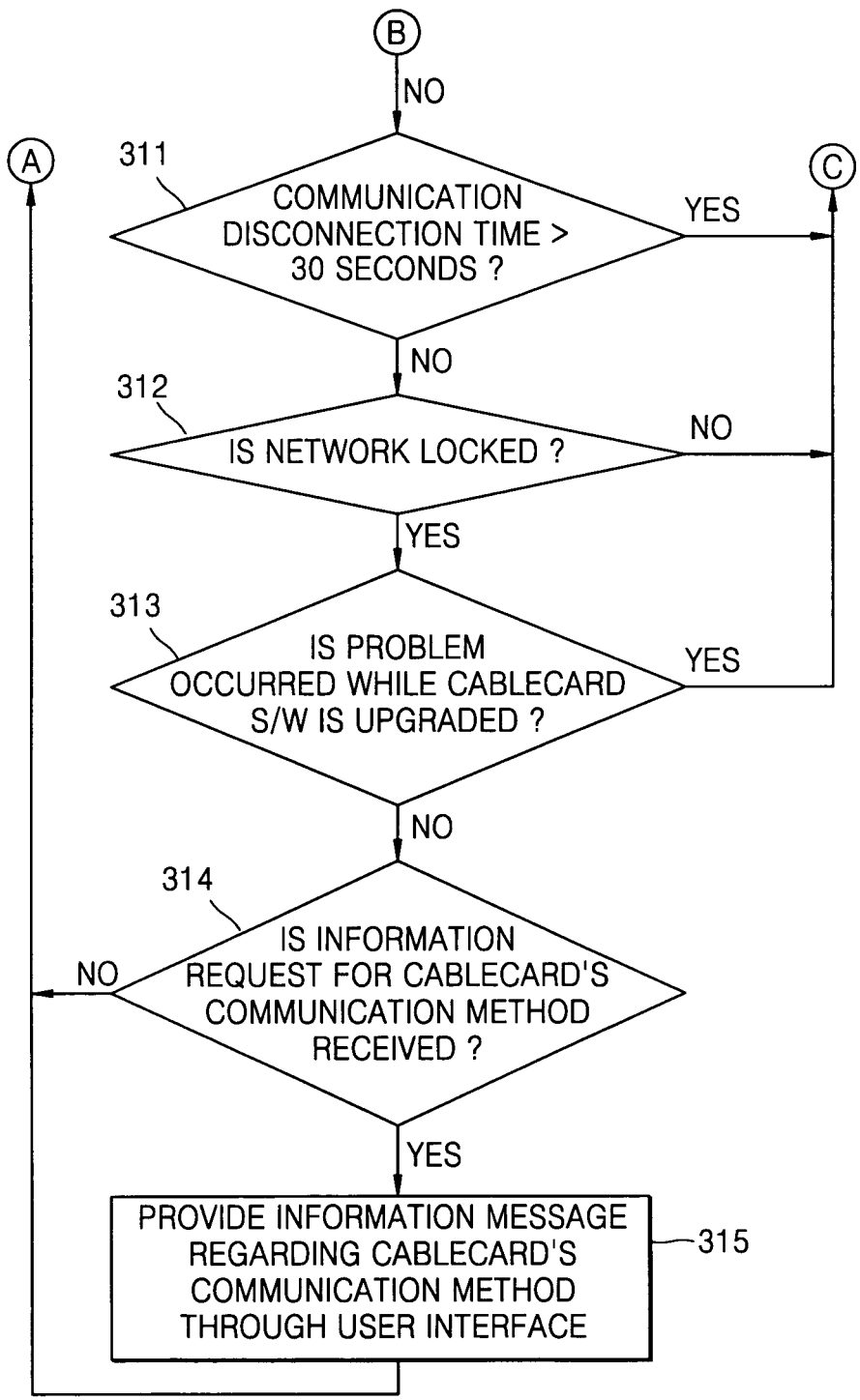

FIG. 3 is a flowchart illustrating a method for diagnosing the POD module-related status in an OpenCable host according to an exemplary embodiment of the present invention.

Referring to FIG. 3, first, a system is initialized (operation 301) and then a host initializes a CableCARD (operation 302). The initialization of the CableCARD is performed by reading CIS data from a virtual memory of the CableCARD and correctly writing the SCTE interface ID to a COR of a POD module.

During the initialization, the host determines whether access to the virtual memory of the CableCARD is disallowed or whether the configuration of the CIS data is mismatched, etc. (operation 303).

The access to the virtual memory of the CableCARD may be disallowed when power is initially turned on, when power is again turned on shortly after the power is turned off, when a user plugs the CableCARD into a CableCARD slot of a television or a set-top box shortly after unplugging the Cable-CARD. In these cases, the CableCARD and the television are initialized to each other. During the initialization, the host must read information regarding the type of the CableCARD from an attribute memory of the CableCARD. In order to perform this operation, access to the attribute memory must be granted to the host. That is, as soon as a CableCARD is inserted into a television, the television accesses an attribute memory and register of the CableCARD. In a normal case, the television reads 256-1024 bytes from the attribute memory and obtains information regarding the type, supply voltage, etc. of the CableCARD from the read information. If the access to the attribute memory is not granted to the host, it is determined that the hardware of the CableCARD has faults or that the CableCARD does not support the OpenCable specification.

Also, the CIS contains information regarding what the PCMCIA card is used for, the manufacturer of the PCMCIA card, the specification of the PCMCIA card, etc. In the present exemplary embodiment, the information of the CIS must match with information of a CableCard which supports only the OpenCable specification. Here, it is important that a conversion into a CableCARD mode is carried out by correctly writing a SCTE_IFN to the COR. If the information does not match, the PCMCIA card cannot extend to a CableCARD and function as a CableCARD for DTV. The analysis for the CIS information is substantially for primary protection against illicit CableCARDs.

If it is determined in operation 303 that the access to the virtual memory of the CableCARD is allowed and the data configuration of the CIS is matched, the initialization of the CableCARD is complete (operation 305). If the access to the virtual memory of the CableCARD is not allowed or if the data configuration of the CIS is mismatched, the process proceeds to operation 302 in order to again try the initialization of the CableCARD. If the access disallowance to the virtual memory of the CableCARD or the mismatch in the configuration of the CIS is determined three times, an error message is displayed through a user interface (operation 304). An example of the error message output to the user interface when the access to the virtual memory of the CableCARD is not allowed or when the configuration of the CIS is mismatched is shown in FIG. 4A. The error message shown in FIG. 4A contains contents indicating "CableCARD Critical Error!!!! Please Call the Service Provider and Change the New CableCARD."

After the initialization of the CableCARD is complete, a response time is determined (operation 306). The determination of the response time of the CableCARD is carried out when the initialization of the CableCARD is completed and the CableCARD is normally performing its basic functions. The CableCARD operates together with the television. Since a television is generally used for a long time, error processing against the long time use of the CableCARD and the television is needed. Accordingly, by measuring a response time of the CableCARD through the television under the assumption that the television operates properly, and determining whether or not the response time exceeds a predetermined threshold time (for example, three seconds), the existence of an error is determined. If the response time exceeds the predetermined threshold time, it is determined that a problem exists in the CableCARD module and proper processing is performed.

If the response time exceeds the predetermined threshold time (for example, three seconds), a software reset is performed (operation 307). The software reset, which is also called a POD reset, is carried out by instructing the host to set a RS bit of the COR whenever a change occurs in a POD attribute. At this time, the host and the POD module are initialized to a PCMCIA interface and changes to a POD interface at a predetermined time, and this change is defined as a "change in POD attribute."

When the host sets the RS bits of both a data channel and its extended channel, the POD module detects channels whose RS bits are set. If the channels whose RS bits are set are detected, open sessions and transmission connections are all closed and the method returns to the operation just after the change occurs in the POD attribute. Since this reset prevents changes in routing of MPEG data streams, viewers cannot perceive any problems as long as A/V streams that they are watching are not scrambled.

The POD reset is performed when the host detects an error in the POD module interface.

Then, it is again determined whether the response time exceeds three seconds (operation 308). If the response time exceeds three seconds, a hardware reset is performed (operation 309). The hardware reset, which is also called a PCMCIA reset, is performed by the host transmitting a rest signal to the POD module. At this time, the interface returns to the PCMCIA interface to which the POD module no longer routes MPEG data streams. Accordingly, the PCMCIA reset should not be performed unless a critical error exists in the POD module or in the interface between the host and the POD module.

Then, it is again determined whether the response time exceeds three seconds (operation 310). If the response time exceeds three seconds, an error message is displayed on the user interface (operation 304). An example of the error message output to the user interface when the response time exceeds three seconds is shown in FIG. 4B. The error message shown in FIG. 4B contains contents indicating "CableCARD Operation is Unstable!! Please Call the Service Provider and Change the New CableCARD."

However, if the response time does not exceed three seconds three times in operations 306, 308, and 310, a communication disconnection time is checked (operation 311). If communication with the headend and the outside is disconnected for thirty seconds, that is, if no downstream information is received for thirty seconds, a network test is carried out using a Packet Internet Groper (PING). If a PING fails, it is determined that a problem exists on the network and an appropriate message is displayed to the user.

If the communication disconnection time exceeds thirty seconds, an error message is displayed through the user interface (operation 304).

An example of the error message displayed through the user interface when the communication disconnection time exceeds thirty seconds is shown in FIG. 4C. The error message shown in FIG. 4C contains contents indicating "Network State is Unstable!! Please Call the Service Provider."

If the communication disconnection time does not exceed thirty seconds, the state of the network is checked (operation 312). This is performed by an interactive television in which a CableCARD mainly acts as a communication device when communication with a headend is disconnected. That is, in this case, communication with the headend is disconnected, while communication with the host is connected. In this case, Audio/Video services through the host are supported, however, interactive services, such as interactive application operations, VOD services and so on, are not supported. Also, due to problems related to authentication for the headend, several services for scrambled channels are not supported. In this case, it is determined that a problem exists in the communication line or in the communication equipment of the headend, and an appropriate message is sent to the user interface in order to instruct the user to call the service provider.

Then, it is determined whether an error is generated while software of the CableCARD is upgraded (operation 313). If an error is generated while the internal firmware of the CableCARD is upgraded, or if an error is generated after the CableCARD firmware is upgraded, information indicating to which version the CableCARD firmware is upgraded is provided to the user through the user interface, in order to allow the user to inform the service provider of the error. That is, if an error is generated, an error message is displayed through the user interface (operation 304). An example of the error message displayed through the user interface when the error is generated while the CableCARD software is upgraded, is shown in FIG. 4D. The error message shown in FIG. 4D contains contents indicating "Previous CableCARD Firmware Ver: 00.11.00, Current CableCARD Firmware Ver: 00.11.01, and Current CableCARD Firmware is Unstable."

If no error is generated, it is determined whether a message requesting information on the CableCARD's communication method is received (operation 314). A determination for an interactive communication method is performed in response to a request from the CableCARD. In this case, the user can know through which communication method his/her host is currently communicating. However, many differences exist between OOB and DOCSIS in terms of communication methods, service levels, and usage costs. For this reason, the user needs to know correct information regarding through which communication mode service his/her host is using to communicate. Therefore, by informing the user through a message of information regarding a communication method supported according to the type of the CableCARD, a communication method being currently used, etc. when the CableCARD is initialized, it is possible to allow the user to select services. If an information request is received, an information message regarding the CableCARD's communication method is provided through the user interface (operation 315).

An example of the information message regarding the CableCARD's communication method is shown in FIG. 4E. The information message shown in FIG. 4E contains contents indicating "current service mode is DOCSIS and CableCARD support mode is OOB/DOCSIS".

Then, in order to continue to monitor the status of the CableCARD or the network, the process proceeds to operation 306. If no information request for the CableCARD's communication method is received, the process proceeds to operation 306.

The CableCARD-related status diagnosing and processing method as described above can also be embodied as computer readable code/instructions/programs on a computer readable recording medium. Examples of the computer readable recording medium include storage media, such as magnetic storage media (for example, ROMs, floppy disks, hard disks, magnetic tapes, etc.), optical reading media (for example, CD-ROMs, DVDs, etc.), carrier waves (for example, transmission through the Internet) and the like. The computer readable recording medium can also be distributed over network coupled computer systems so that the computer readable code is stored and executed in a distributed fashion. Functional programs/code/code segments for implementing the present invention can be easily deduced by programmers skilled in the art.

As described above, according to exemplary embodiments of the present invention, by installing a software-processing logic against critical errors or definite faults in a television or a set-top box in an OpenCable system, it is possible to diagnose a CableCARD-related status and quickly handle the CableCARD when a problem is generated in the Cable-CARD, thereby reducing costs for service providers and providing an improvement in service quality to users. Specifically, relative to the case when digital interactive services are not verified and thus a large amount of time is consumed in testing CableCARDs, televisions, or set-top boxes and unexpected errors may be generated, significant cost reduction is expected by applying prevention handling to components in which the generation of error is expected, diagnosing the generation of critical errors, and performing proper processing when such critical errors are generated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for diagnosing a CableCARD-related status of a CableCARD which is inserted into a host device, and performing proper processing according to a diagnosis result in an OpenCable system, the apparatus comprising:
a diagnosis unit which diagnoses the CableCARD-related status of the CableCARD, when the CableCARD is inserted into the host device that receives, decodes and outputs a broadcast signal; and
a processor which performs processing according to the CableCARD-related status determined by the diagnosis result,
wherein the processor performs outputting an error message to a user interface and information indicating to which version software of the CableCARD is upgraded if an error is generated while the software of the CableCARD is upgraded.

2. The apparatus of claim 1, wherein the processor performs accessing a virtual memory of the inserted Cable-CARD and outputting another error message to the user interface if access to the virtual memory of the inserted CableCARD is disallowed or if an error exists in Card Information Structure (CIS) data of the inserted CableCARD.

3. The apparatus of claim 2, wherein the processor outputs the another error message to the user interface if the access to the virtual memory of the inserted CableCARD is disallowed or if an error exists in the CIS data of the inserted CableCARD after an initialization operation of the inserted CableCARD is performed at least three times.

4. The apparatus of claim 1, wherein the processor performs determining that a response time of the inserted Cable-CARD exceeds a predetermined threshold time and outputting the error message to the user interface, and wherein the processor resets the software or hardware of the inserted CableCARD and outputs the error message to the user interface if the response time exceeds a first predetermined threshold time after the software or hardware of the inserted Cable-CARD is reset.

5. The apparatus of claim 1, wherein the processor performs determining that a request for information regarding a communication method of the inserted CableCARD to the user interface is received and outputting the information to the user interface.

6. The apparatus of claim 1, wherein the processor performs accessing an attribute memory storing information regarding a type of the inserted CableCARD and outputting another error message to the user interface if access to the attribute memory of the inserted CableCARD is disallowed.

7. The apparatus of claim 1, wherein the processor performs accessing an attribute memory storing Card Information Structure (CIS) data of the inserted CableCARD, reading the CIS data from the attribute memory and outputting another error message to the user interface if an error exist in the CIS data of the inserted CableCARD,
wherein the CIS data comprises at least one of a supply voltage-related information of the inserted Cable-CARD, a serial code of the inserted CableCARD, a version of the inserted CableCARD and a module name of the inserted CableCARD.

8. An OpenCable host apparatus comprising:
a main circuit which receives a broadcast signal via a network, and decodes and outputs the broadcast signal;
a controller which controls the main circuit, communicates with the network through the main circuit, diagnoses a Point of Deployment (POD) module-related status, and performs processing according to the POD module-related status determined from a diagnosis result, wherein the POD module is removable; and
a POD interface which communicates with the POD module,
wherein the controller outputs, through a user interface, an error message and information indicating to which version software a CableCARD is upgraded if an error is generated while the software of the CableCARD is upgraded, the CableCARD being inserted into the OpenCable host apparatus.

9. The apparatus of claim 8, wherein the controller outputs a first error message to the user interface if an error exists in the Card Information Structure data of the inserted Cable-CARD after an initialization operation of the inserted Cable-CARD is performed at least three times.

10. The apparatus of claim 8, wherein the controller resets the software or hardware of the inserted CableCARD and outputs a second error message to the user interface if a response time of the inserted CableCARD exceeds a first predetermined threshold time after the software or hardware of the inserted CableCARD is reset.

11. The apparatus of claim 8, wherein the controller performs a ping test and outputs a fourth error message to the user interface if the ping test fails.

12. An OpenCable reception apparatus comprising:
a host including:
a main circuit which receives a broadcast signal via a network, and decodes and outputs the broadcast signal; and
a controller which controls the main circuit, communicates with the network through the main circuit, diagnoses a Point of Deployment (POD) module-related status, and performs processing corresponding to the POD module-related status according to a diagnosis result, wherein the POD module is removable; and
a CableCARD which is removably plugged into the host, wherein the controller outputs, through a user interface, an error message and information indicating to which version software a CableCARD is upgraded if an error is generated while the software of the CableCARD is upgraded, the CableCARD being inserted into the host through the user interface if a request for the information is received.

13. A method of diagnosing a CableCARD-related status of a CableCARD which is inserted into a host device, and performing proper processing according to a diagnosis result in an OpenCable system, the method comprising:

diagnosing the CableCARD-related status of the Cable-CARD when the CableCARD is inserted into the host device that receives, decodes and outputs a broadcast signal;

performing processing according to the CableCARD-related status determined from a diagnosis result; and outputting a first error message to a user interface and information indicating to which version software of the CableCARD is upgraded if an error is generated while the software of the CableCARD is upgraded.

14. The method of claim 13, wherein the processing further comprises at least one of:

outputting a second error message to the user interface if access to a virtual memory of the inserted CableCARD is disallowed or if an error exists in Card Information Structure (CIS) data of the inserted CableCARD;

resetting software or hardware of the inserted CableCARD or outputting third second error message to the user interface if a response time of the inserted CableCARD exceeds a predetermined threshold time; and outputting information regarding a communication method of the inserted CableCARD through the user interface if a request for the information is received.

15. An apparatus for diagnosing a CableCARD-related status of a CableCARD which is inserted into a host device, and performing proper processing according to a diagnosis result in an OpenCable system, the apparatus comprising:

a diagnosis unit which diagnoses the CableCARD-related status of the CableCARD, when the CableCARD is inserted into the host device that receives, decodes and outputs a broadcast signal or a network-related status; and a processor which performs processing according to the CableCARD-related status or the network-related status determined by the diagnosis result, wherein the processor performs determining that communication with the outside is disconnected for a predetermined threshold time and performing a ping test or outputting an error message to a user interface wherein the processor performs outputting an error message to a user interface and information indicating to which version software of the CableCARD is upgraded if an error is generated while the software of the Cable-CARD is upgraded.

16. The apparatus of claim 15, wherein the processor performs a ping test and outputs the error message to the user interface if the ping test fails.

* * * * *